(12) United States Patent
Nanri et al.

(10) Patent No.: US 9,983,010 B2
(45) Date of Patent: May 29, 2018

(54) DEVICE, PROGRAM, RECORDING MEDIUM AND METHOD FOR FACILITATING MANAGEMENT OF SCHEDULE OF VOYAGE

(71) Applicant: NIPPON YUSEN KABUSHIKI KAISHA, Tokyo (JP)

(72) Inventors: Takafumi Nanri, Tokyo (JP); Atsushi Yamaguchi, Tokyo (JP); Masaharu Urabe, Tokyo (JP); Ryo Kakuta, Tokyo (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 31 days.

(21) Appl. No.: 14/916,709

(22) PCT Filed: Sep. 6, 2013

(86) PCT No.: PCT/JP2013/074114
§ 371 (c)(1),
(2) Date: Mar. 4, 2016

(87) PCT Pub. No.: WO2015/033443
PCT Pub. Date: Mar. 12, 2015

(65) Prior Publication Data
US 2016/0195399 A1 Jul. 7, 2016

(51) Int. Cl.
*B60L 3/00* (2006.01)
*B60L 15/00* (2006.01)
(Continued)

(52) U.S. Cl.
CPC ............ *G01C 21/203* (2013.01); *B63B 49/00* (2013.01); *G08G 3/00* (2013.01); *Y02T 70/745* (2013.01)

(58) Field of Classification Search
CPC ..... G01C 21/203; B63B 49/00; Y02T 70/745; G08G 3/00
(Continued)

(56) References Cited

U.S. PATENT DOCUMENTS

2008/0147257 A1* 6/2008 Kuhlgatz ............... B63B 49/00
701/21
2010/0185471 A1* 7/2010 Chen ..................... G06Q 10/06
705/7.38

(Continued)

FOREIGN PATENT DOCUMENTS

| JP | 02-138815 A | 5/1990 |
|---|---|---|
| JP | 2007-057499 A | 3/2007 |
| JP | 2010-001114 A | 1/2010 |

OTHER PUBLICATIONS

Notification of Reasons for Refusal for Japanese Patent Application No. 2014-525663, dated Jul. 8, 2014, pp. 1-3.
(Continued)

*Primary Examiner* — Aaron L Troost
*Assistant Examiner* — Paula L Schneider
(74) *Attorney, Agent, or Firm* — MKG, LLC

(57) ABSTRACT

In connection with a voyage in which a ship visits several ports on a sailing route, when a user inputs a berthing period at each port on the sailing route on a screen in a computer for managing voyage information displayed by a terminal device, the terminal device specifies, with regard to each sectional sailing route between two neighboring ports on the sailing route, fuel consumption rate when the ship sails on the sectional sailing route based on a sailing speed determined by the input berthing periods and parameters of maritime weather conditions under which the ship sails on the sectional sailing route. The terminal device calculates fuel consumption required for sailing on each sectional
(Continued)

sailing route and total fuel consumption required for sailing the entire sailing route using the specified fuel consumption rates.

2 Claims, 11 Drawing Sheets

(51) Int. Cl.
    *G05D 1/00*         (2006.01)
    *G05D 3/00*         (2006.01)
    *G06F 7/00*          (2006.01)
    *G06F 17/00*        (2006.01)
    *G01C 21/20*       (2006.01)
    *B63B 49/00*       (2006.01)
    *G08G 3/00*         (2006.01)

(58) Field of Classification Search
    USPC .......................................................... 701/21
    See application file for complete search history.

(56) References Cited

U.S. PATENT DOCUMENTS

| | | | |
|---|---|---|---|
| 2011/0172871 A1* | 7/2011 | Hall ...................... | B60W 50/14 |
| | | | 701/31.4 |
| 2012/0259489 A1* | 10/2012 | Hamamatsu ........... | B63H 25/04 |
| | | | 701/21 |
| 2012/0277941 A1* | 11/2012 | Noffsinger .............. | B63B 49/00 |
| | | | 701/21 |
| 2016/0265920 A1* | 9/2016 | Yamaguchi ............ | G01C 21/20 |

OTHER PUBLICATIONS

Written Opinion issued in corresponding PCT Application No. PCT/JP2013/074114 dated Dec. 3, 2013, pp. 1-4.
International Search Report issued in corresponding PCT Application No. PCT/JP2013/074114 dated Dec. 3, 2013.

* cited by examiner

TABLE OF VOYAGE INFORMATION PER SECTIONAL SAILING ROUTE

VOYAGE ID "###," NAME OF SHIP "###," NAME OF SAILING ROUTE "###"

| SECTIONAL SAILING ROUTE | SAILING DISTANCE | DRAFT | TRIM | WIND SPEED | WIND DIRECTION | WAVE HEIGHT | WAVE DIRECTION | TIDE SPEED | TIDE DIRECTION | FUEL CONSUMPTION | SAILING DISTANCE (ACTUALLY MEASURED) |
|---|---|---|---|---|---|---|---|---|---|---|---|
| A - B | ... | ... | ... | ... | ... | ... | ... | ... | ... | ... | ... |
| B - C | ... | ... | ... | ... | ... | ... | ... | ... | ... | — | — |
| C - D | ... | ... | ... | ... | ... | ... | ... | ... | ... | — | — |
| D - E | ... | ... | ... | ... | ... | ... | ... | ... | ... | — | — |
| E - A | ... | ... | ... | ... | ... | ... | ... | ... | ... | — | — |

FIG. 10A

TABLE OF VOYAGE INFORMATION PER PORT

| PORT | ORIGINAL VOYAGE SCHEDULE | | | | CURRENT VOYAGE SCHEDULE | | | |
|---|---|---|---|---|---|---|---|---|
| | BERTH WINDOW | | BERTHING PERIOD | | BERTH WINDOW | | BERTHING PERIOD | |
| | STARTING TIME | ENDING TIME | STARTING TIME | ENDING TIME | STARTING TIME | ENDING TIME | STARTING TIME | ENDING TIME |
| A | ... | ... | ... | ... | ... | ... | ... | ... |
| B | ... | ... | ... | ... | ... | ... | ... | ... |
| C | ... | ... | ... | ... | ... | ... | ... | ... |
| D | ... | ... | ... | ... | ... | ... | ... | ... |
| E | ... | ... | ... | ... | ... | ... | ... | ... |
| A | ... | ... | ... | ... | ... | ... | ... | ... |

| MODIFIED VOYAGE SCHEDULE | | | | | RECORD OF ACTUAL VOYAGE | | |
|---|---|---|---|---|---|---|---|
| BERTH WINDOW | | BERTHING PERIOD | | | BERTHING PERIOD | | |
| STARTING TIME | LOCKED | ENDING TIME | LOCKED | STARTING TIME | LOCKED | ENDING TIME | LOCKED | STARTING TIME | ENDING TIME |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

*FIG. 10B*

| NAME OF SAILING ROUTE | SAILING ROUTE |
|---|---|
| ... | ... |
| ... | ... |
| ... | ... |

*FIG. 11*

| PORT TO PORT | DISTANCE |
|---|---|
| ... | ... |
| ... | ... |
| ... | ... |

*FIG. 12*

SHIP ID "###"

| WIND SPEED | WIND DIRECTION | WAVE HEIGHT | WAVE DIRECTION | TIDE SPEED | TIDE DIRECTION | DRAFT | TRIM | SAILING SPEED | FUEL CONSUMPTION |
|---|---|---|---|---|---|---|---|---|---|
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

*FIG. 13*

TIME PERIOD "###-###," SEA AREA "##-##"

| WIND DIRECTION | WIND SPEED | WAVE HEIGHT | WAVE DIRECTION | TIDE SPEED | TIDE DIRECTION |
|---|---|---|---|---|---|
| ... | ... | ... | ... | ... | ... |

| SECTIONAL SAILING ROUTE | DRAFT | TRIM |
|---|---|---|
| ... | ... | ... |

(b)

| PORT DEPARTED BY SHIP | DEPARTURE TIME |
|---|---|
| ... | ... |

(c)

| MEASURING TIME | FUEL CONSUMPTION | SAILING DISTANCE |
|---|---|---|
| ... | ... | ... |

(d)

| PORT ARRIVED BY SHIP | ARRIVAL TIME |
|---|---|
| ... | ... |

FIG. 15

DEVICE, PROGRAM, RECORDING MEDIUM AND METHOD FOR FACILITATING MANAGEMENT OF SCHEDULE OF VOYAGE

TECHNICAL FIELD

The present invention pertains to a technique of facilitating management by a user of a schedule of a voyage.

BACKGROUND

There is a need for reducing fuel consumption required for a ship to carry out a voyage from a specified departure port to a specified destination port as much as possible under a condition that the ship can arrive at the destination port by a certain timing.

For example, JP2007-057499A is an example of a document that discloses a technique that meets the above-mentioned need. JP2007-057499A discloses a system that calculates, with regard to each section between neighboring nodes set in an area between a departure point and a destination point, a sailing speed, fuel consumption, etc. based on data sets indicating performance of a ship that sails from the departure point to the destination point and data sets indicating maritime weather conditions in the area, and searches the best sailing route from the departure point to the destination point based on the calculated sailing speeds, fuel consumption, etc. In JP2007-057499A, "the best sailing route" is defined as a sailing route that incurs the lowest cost calculated based on fuel consumption, sailing time, etc.

When a ship visits ports on a sailing route during a voyage, it is necessary to reserve in advance a time slot for using a berth at each port. This time slot is usually referred to as a "berth window," and is frequently expressed as "B/W." Usually, a ship operation manager or a ship agent who undertakes various operations at a port such as cargo handling operations on behalf of the ship operation manager applies to the relevant port authority for a desired berth window for a ship, and the port authority allocates a berth window to the ship in response to the application.

Once berth windows are allocated, a sailing time of each section of a sailing route between a port and its subsequent port is roughly determined. Once a sailing time of each section of a sailing route is determined, a sailing speed over each section of the sailing route is determined. Once a sailing speed over each section of a sailing route is determined, fuel consumption required for sailing each section of the sailing route is determined. Accordingly, total fuel consumption required for sailing the entire sailing route is affected by a berth window allocated to the ship at each port to be visited by the ship during a voyage.

Within an allocated berth window, a time period during which a ship is actually docked at a berth can be adjusted. For example, a ship may dock at a berth at a beginning time of an allocated berth window and leave the berth before an ending time of the berth window after all operations for the ship performed at the berth, such as cargo handling operations, are completed. Alternatively, a ship may dock at a berth later than a beginning time of an allocated berth window and leave the berth almost at an ending time of the berth window after all operations for the ship performed at the berth are completed. Sailing times of sections of a sailing route before and after the port differ between the former case and the latter case. Accordingly, total fuel consumption required for sailing the entire sailing route is also affected by a time period during which a ship is actually docked at a berth within an allocated berth window.

Therefore, if a ship operation manager, a ship's navigator or the like can know in advance a preferable time period of docking a ship at a berth that causes a reduction in total fuel consumption required for the entire sailing route, he/she can achieve a reduction in total fuel consumption by reserving a berth window covering the preferable time period, by shifting a time period during which a ship is actually docked at a berth within an allocated berth window so that the time period becomes close to the preferable time period, or by shifting an allocated berth window so that the allocated berth window covers the preferable time period.

SUMMARY

In view of the foregoing circumstances, the purpose of the present invention is to enable a user such as a ship operation manager and a ship's navigator to specify a preferable time period for a ship to be docked at a berth at each of ports visited by the ship during a voyage from the viewpoint of reduction in fuel consumption required for the voyage.

To solve the above explained problem, in the present invention, there is provided A device for managing a schedule of a voyage made by a ship sailing on a sailing route from a departure port to a destination port, the ship visiting one or more ports on a remaining part of the sailing route from a reference location to the destination port, comprising: an acquisition unit that acquires a voyage schedule data set indicating a schedule of the voyage containing a reference time when the ship is located at the reference location, a starting time of a time period during which the ship is docked at a berth of each of the one or more ports, an ending time of the time period and an arrival time when the ship arrives at the destination port; distance data sets indicating a distance between the reference location and a subsequent port and a distance between two ports with regard to each set of two consecutive ports on the remaining part of the sailing route; and fuel consumption rate data sets each indicating a fuel consumption rate when the ship sails at a certain sailing speed, a calculation unit that calculates a sailing speed at which the ship sails from the reference location to a subsequent port and a sailing speed at which the ship sails from a port to a subsequent port with regard to each set of two consecutive ports on the remaining part of the sailing route, and calculates fuel consumption required for the ship to sail from the reference location to the destination port, based on the voyage schedule data set, the distance data sets and the fuel consumption rate data sets, and an output unit that outputs a data set indicating the fuel consumption calculated by the calculation unit.

In a preferred embodiment of the above mentioned device, the acquisition unit may acquire the voyage schedule data set as a first voyage schedule data set, the acquisition unit may acquire a second voyage schedule data set indicating a schedule of the voyage that is different from the schedule of the voyage indicated by the first voyage schedule data set with regard to at least one of the starting times, the ending times and the arrival time, the calculation unit may calculate the fuel consumption as first fuel consumption, the calculation unit may calculate a sailing speed at which the ship sails from the reference location to a subsequent port and a sailing speed at which the ship sails from a port to a subsequent port with regard to each set of two consecutive ports on the remaining part of the sailing route, and calculates fuel consumption required for the ship to sail from the reference location to the destination port as second fuel consumption, based on the second voyage schedule data set, the distance data sets and the fuel consumption rate data sets, and the output unit may output a data set indicating the second fuel consumption.

In a preferred embodiment of the above mentioned device, the acquisition unit may acquire an original voyage data set indicating an original schedule of the voyage containing a starting time of a time period during which the ship is docked at a berth of each of the one or more ports, an ending time of the time period and an arrival time when the ship arrives at the destination port, and the output unit may output a data set indicating a difference between an original time and a modified time, the original time being one of the starting times, the ending times and the arrival time contained in the schedule of the voyage indicated by the original voyage schedule data set, the modified time being a time contained in the schedule of the voyage indicated by the modified voyage schedule data set corresponding to the original time.

In a preferred embodiment of the above mentioned device, the acquisition unit may acquire a third voyage schedule data set indicating a schedule of the voyage that is different from the schedule of the voyage indicated by the second voyage schedule data set with regard to at least one of the starting times, the ending times and the arrival time, the calculation unit may calculate a sailing speed at which the ship sails from the reference location to a subsequent port and a sailing speed at which the ship sails from a port to a subsequent port with regard to each set of two consecutive ports on the remaining part of the sailing route, and may calculate fuel consumption required for the ship to sail from the reference location to the destination port as third fuel consumption, based on the third voyage schedule data set, the distance data sets and the fuel consumption rate data sets, the calculation unit may compare the second fuel consumption and the third fuel consumption, and the output unit may output a data set indicating a result of the comparison performed by the calculation unit.

In a preferred embodiment of the above mentioned device, each of the fuel consumption rate data sets may indicate a fuel consumption rate when the ship sails at a certain sailing speed under a certain maritime weather condition that affects fuel consumption, the acquisition unit may acquire maritime weather data sets indicating maritime weather conditions under which the ship sails on the remaining part of the sailing route, and the calculation unit may specify the fuel consumption rate data sets each of which corresponds to a combination of a sailing speed at which the ship sails on a section of the remaining part of the sailing route calculated by the calculation unit and a maritime weather condition under which the ship sails on the section of the remaining part of the sailing route indicated by one of the maritime weather data sets acquired by the acquisition unit, and may calculate the fuel consumption required for the ship to sail from the reference location to the destination port based on the specified fuel consumption rate data sets.

In a preferred embodiment of the above mentioned device, the acquisition unit may acquire an actual fuel consumption data set indicating fuel consumption that is used for the ship to sail from the departure port to the reference location, and the calculation unit may calculate total fuel consumption required for the ship to sail from the departure port to the destination port by adding the fuel consumption indicated by the actual fuel consumption data set to the fuel consumption required for the ship to sail from the reference location to the destination port calculated by the calculation unit.

In a preferred embodiment of the above mentioned device, when the calculation unit calculates the fuel consumption required for the ship to sail from the reference location to the destination port, the calculation unit may calculate fuel consumption required for the ship to sail from the reference location to a subsequent port and fuel consumption required for the ship to sail from a port to a subsequent port with regard to each set of two consecutive ports on the remaining part of the sailing route as sectional fuel consumption, and the output unit may output data sets indicating the sectional fuel consumption.

In addition, in the present invention, there is provided a program for causing a computer to execute, for managing a schedule of a voyage made by a ship sailing on a sailing route from a departure port to a destination port, the ship visiting one or more ports on a remaining part of the sailing route from a reference location to the destination port, acquiring a voyage schedule data set indicating a schedule of the voyage containing a reference time when the ship is located at the reference location, a starting time of a time period during which the ship is docked at a berth of each of the one or more ports, an ending time of the time period and an arrival time when the ship arrives at the destination port, acquiring distance data sets indicating a distance between the reference location and a subsequent port and a distance between two ports with regard to each set of two consecutive ports on the remaining part of the sailing route, acquiring fuel consumption rate data sets each indicating a fuel consumption rate when the ship sails at a certain sailing speed, calculating a sailing speed at which the ship sails from the reference location to a subsequent port and a sailing speed at which the ship sails from a port to a subsequent port with regard to each set of two consecutive ports on the remaining part of the sailing route, and calculating fuel consumption required for the ship to sail from the reference location to the destination port, based on the voyage schedule data set, the distance data sets and the fuel consumption rate data sets, and outputting a data set indicating the calculated fuel consumption.

Furthermore, in the present invention, there is provided a computer-readable recording medium continuously storing a program for causing a computer to execute, for managing a schedule of a voyage made by a ship sailing on a sailing route from a departure port to a destination port, the ship visiting one or more ports on a remaining part of the sailing route from a reference location to the destination port, acquiring a voyage schedule data set indicating a schedule of the voyage containing a reference time when the ship is located at the reference location, a starting time of a time period during which the ship is docked at a berth of each of the one or more ports, an ending time of the time period and an arrival time when the ship arrives at the destination port, acquiring distance data sets indicating a distance between the reference location and a subsequent port and a distance between two ports with regard to each set of two consecutive ports on the remaining part of the sailing route, acquiring fuel consumption rate data sets each indicating a fuel consumption rate when the ship sails at a certain sailing speed, calculating a sailing speed at which the ship sails from the reference location to a subsequent port and a sailing speed at which the ship sails from a port to a subsequent port with regard to each set of two consecutive ports on the remaining part of the sailing route, and calculating fuel consumption required for the ship to sail from the reference location to the destination port, based on the voyage schedule data set, the distance data sets and the fuel consumption rate data sets, and outputting a data set indicating the calculated fuel consumption.

Furthermore, in the present invention, there is provided a method for managing a schedule of a voyage made by a ship sailing on a sailing route from a departure port to a destination port, the ship visiting one or more ports on a remaining part of the sailing route from a reference location to the destination port, comprising: a step for acquiring a voyage schedule data set indicating a schedule of the voyage containing a reference time when the ship is located at the reference location, a starting time of a time period during which the ship is docked at a berth of each of the one or more ports, an ending time of the time period and an arrival time when the ship arrives at the destination port, a step for acquiring distance data sets indicating a distance between the reference location and a subsequent port and a distance between two ports with regard to each set of two consecutive ports on the remaining part of the sailing route, a step for acquiring fuel consumption rate data sets each indicating a fuel consumption rate when the ship sails at a certain sailing speed, a step for calculating a sailing speed at which the ship sails from the reference location to a subsequent port and a sailing speed at which the ship sails from a port to a subsequent port with regard to each set of two consecutive ports on the remaining part of the sailing route, and calculating fuel consumption required for the ship to sail from the reference location to the destination port, based on the voyage schedule data set, the distance data sets and the fuel consumption rate data sets, and a step for outputting a data set indicating the calculated fuel consumption.

According to the present invention, fuel consumption, on which an effect of a time period during which a ship is actually docked at a berth of each of ports visited by the ship during a voyage is reflected, is determined, and a data set indicating the determined fuel consumption is output. Therefore, a user such as a ship operation manager and ship's navigator can know a relationship between a time period during which the ship is actually docked at a berth and fuel consumption required for the voyage. As a result, the user can specify a preferable time period during which the ship is actually docked at the berth from the viewpoint of reduction in fuel consumption required for the voyage.

BRIEF EXPLANATION OF THE DRAWINGS

FIG. 10A A drawing illustrating an exemplary data structure of voyage management data sets used by a voyage management server device according to an exemplary embodiment of the present invention.

FIG. 10B A drawing illustrating an exemplary data structure of voyage management data sets used by a voyage management server device according to an exemplary embodiment of the present invention.

FIG. 11 A drawing illustrating an exemplary data structure of a sailing route data set used by a voyage management server device according to an exemplary embodiment of the present invention.

FIG. 12 A drawing illustrating an exemplary data structure of distance data sets used by a voyage management server device according to an exemplary embodiment of the present invention.

FIG. 13 A drawing illustrating an exemplary data structure of fuel consumption rate data sets used by a voyage management server device according to an exemplary embodiment of the present invention.

FIG. 14 A drawing illustrating an exemplary data structure of a maritime weather data set that is transmitted from a maritime weather data distribution server to a voyage management server device according to an exemplary embodiment of the present invention.

FIG. 15(a), FIG. 15(b), FIG. 15(c) and FIG. 15(d) illustrate an exemplary data structure of result data sets that are transmitted from a shipboard terminal device to a voyage management server device according to an exemplary embodiment of the present invention.

DETAILED DESCRIPTION

[1. Exemplary Embodiment]

A configuration and operations of berthing-time determination support system 1 according to an exemplary embodiment of the present invention are explained below. Berthing-time determination support system 1 is a system for facilitating determination of a preferable time period during which a ship is docked at a berth at each port visited by the ship during a voyage from the viewpoint of a reduction in fuel consumption required for the voyage by presenting to a user fuel consumption required for the voyage before and after a time period during which the ship is docked at a berth of a port is shifted. A port visited by a ship during a voyage is referred to as a "visited port" hereinafter. A time period during which a ship is docked at a berth of a port is referred to as a "berthing period" hereinafter.

In this exemplary embodiment, a berthing period is defined as a time period from a timing when a ship arrives at a berth at a port to a timing when the ship leaves the berth, and a time period used for ship handling in the port is included in a berthing period.

A section of a sailing route between a visited port and its subsequent visited port is referred as a "sectional sailing route" hereinafter.

Figure 1:
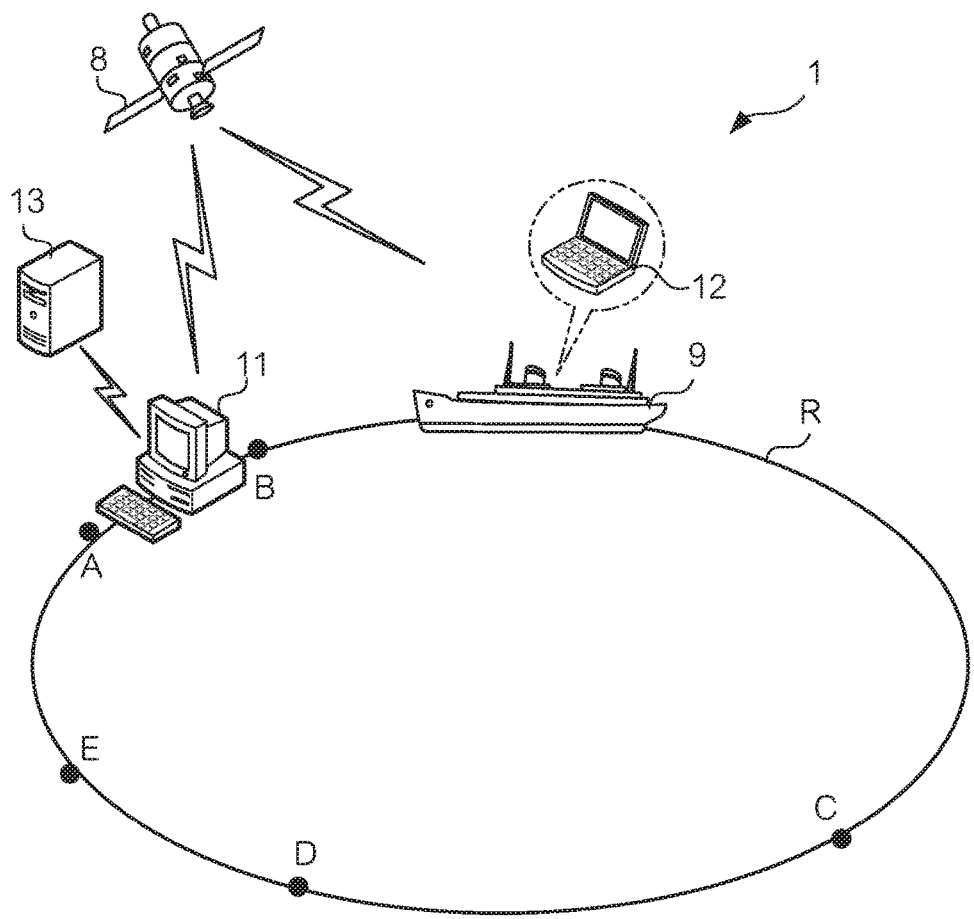
FIG. 1 A drawing illustrating an overall configuration of a berthing-time determination support system according to an exemplary embodiment of the present invention.

FIG. 1 is a drawing schematically illustrating an overall configuration of berthing-time determination support system 1. Berthing-time determination support system 1 comprises voyage management server device 11 that is used by, for example, a ship operation manager, shipboard terminal device 12 that is located in ship 9 and used by, for example, the ship's navigator, and maritime weather data distribution server device 13 that distributes data sets indicating information on maritime weather conditions in the past and in the future to voyage management server device 11 in response to a request from voyage management server device 11. Data sets indicating marine weather conditions are referred to as "maritime weather data sets" hereinafter.

Voyage management server device 11 is a server device that manages a schedule of a voyage made by ship 9. At the same time, voyage management server device 11 functions as a Web server device that distributes to shipboard terminal device 12 various data sets such as data sets indicating the schedule of the voyage in response to a request from shipboard terminal device 12. Further, voyage management server device 11 functions as a terminal device directly operated by a user such as a ship operation manager. A schedule of a voyage managed by voyage management server device 11 is defined by a berth window and a berthing period of each of the ports visited on a sailing route of the voyage.

Shipboard terminal device 12 transmits to voyage management server device 11 various data sets indicating results of conditions in which the ship sails during the voyage, such as actual fuel consumption for the voyage measured by a sensor located in ship 9 or input by a user of shipboard terminal device 12 such as a ship's navigator. Data sets indicating results of conditions in which the ship sails during the voyage are referred to as "result data sets" hereinafter. Shipboard terminal device 12 also functions as a Web browser that accesses voyage management server device 11 functioning as a Web server device. Shipboard terminal device 12 receives from voyage management server device 11 various data sets such as data sets indicating a schedule of a voyage, and displays information indicated by the received data sets. Voyage management server device 11 and shipboard terminal device 12 perform data communications with each other via communication satellite 8.

In an exemplary case shown in FIG. 1, in voyage "R," after ship 9 leaves departure port "A," it visits ports "B," "C," "D," and "E" in this order, and arrives at destination port "A." At each visited port, cargo handling operations such as cargo loading operations and cargo unloading operations are carried out.

Figure 2:
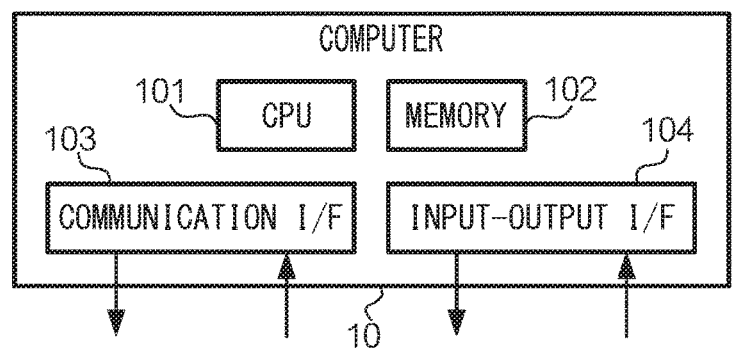
FIG. 2 A drawing illustrating a configuration of a computer used as hardware realizing a voyage management server device, a shipboard terminal device or a maritime weather data distribution server device according to an exemplary embodiment of the present invention.

A computer for general use having a communication unit for exchanging data with other devices may be used as hardware of each of voyage management server device 11, shipboard terminal device 12, and maritime weather data distribution server device 13. FIG. 2 is a drawing illustrating a configuration of computer 10 that is used as hardware of shipboard terminal device 12 or maritime weather data distribution server device 13.

Computer 10 comprises CPU 101 that executes various kinds of data processing in accordance with programs such as an OS and an application program and controls the other components of computer 10, memory 102 that stores the programs executed by CPU 101 and various data sets, communication I/F (interface) 103 that transmits various data sets to external devices and receives various data sets from the external devices, and input-output I/F 104 that inputs various data sets to external devices connected to input-output I/F 104 and receives data sets from the external devices. External devices connected to input-output I/F 104 may include an operation device such as a keyboard and a mouse, a display device, etc.

Shipboard terminal device 12 comprises, as a functional component, an acquisition unit (not shown in figures) that acquires data sets indicating fuel consumption and sailing distances of ship 9 continuously measured by sensors during a voyage, data sets indicating a draft and a trim of ship 9 input by a user such as a navigator of ship 9 and data sets indicating an arrival time at each port and a departure time from each port on a sailing route of the voyage input by the user. Moreover, shipboard terminal device 12 comprises, as a functional component, a transmitting unit (not shown in figures) that transmits data sets acquired by the acquisition unit to voyage management server device 11 as result data sets. Shipboard terminal device 12 further comprises, as functional components, a receiving unit (not shown in figures) that receives data sets indicating various information such as total fuel consumption of an entire voyage of ship 9 from voyage management server device 11, and an outputting unit (not shown in figures) that outputs the data sets received by the receiving unit to an external device such as a display device. Computer 10 that is used as hardware of shipboard terminal device 12 functions as a device that comprises the acquisition unit, the transmitting unit, the receiving unit and the outputting unit explained above, when it executes data processing in accordance with an application program for shipboard terminal device 12.

Maritime weather data distribution server device 13 comprises, as a functional component, a storage unit (not shown in figures) that stores maritime weather data sets indicating maritime weather conditions such as wind speeds, wind directions, wave heights, etc. with regard to various combinations of time periods, either in the past or in the future, and sea areas. Moreover, maritime weather data distribution server device 13 comprises, as functional components, a receiving unit (not shown in figures) that receives a transmission request data set indicating a sea area and a time period from voyage management server device 11, and a retrieval unit (not shown in figures) that retrieves, from among the maritime weather data sets stored in the storage unit, maritime weather data sets corresponding to a combination of the sea area and the time period indicated by the transmission request data set received by the receiving unit. Maritime weather data distribution server device 13 further comprises, as a functional component, a transmitting unit (not shown in figures) that transmits the maritime weather data sets retrieved by the retrieving unit to voyage management server device 11 from which the transmission request is transmitted to maritime weather data distribution server device 13. Computer 10 that is used as hardware of maritime weather data distribution server device 13 functions as a device that comprises the storage unit, the receiving unit, the retrieving unit and the transmitting unit explained above, when it executes data processing in accordance with an application program for maritime weather data distribution server device 13.

Figure 3:
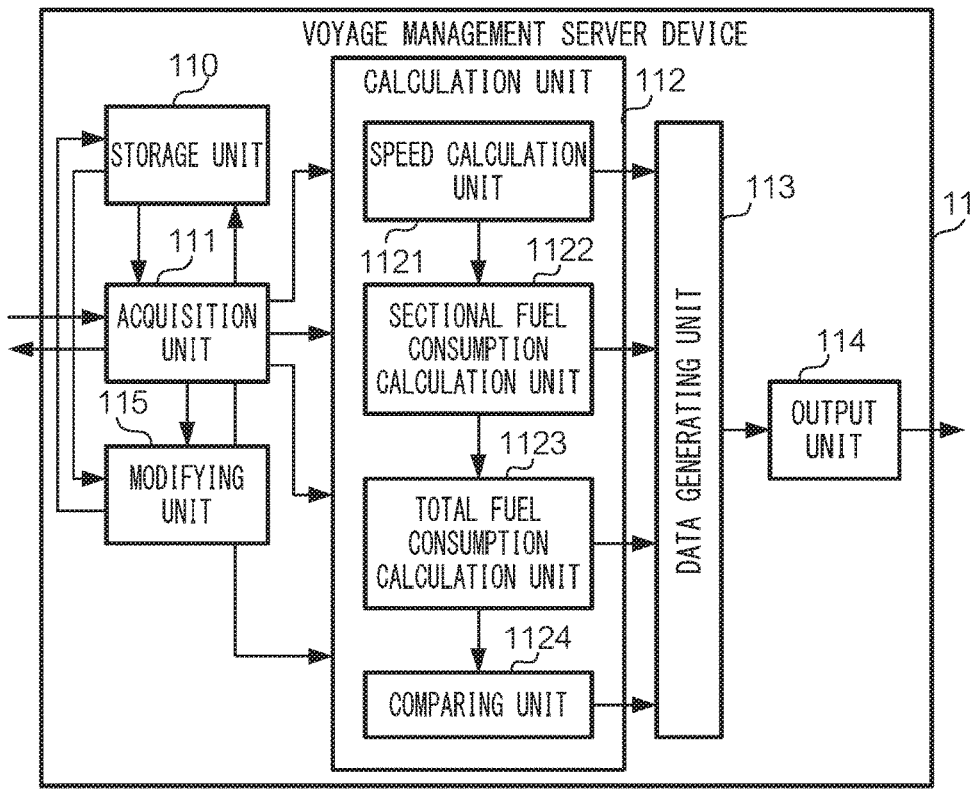
FIG. 3 A drawing illustrating a functional configuration of a voyage management server device according to an exemplary embodiment of the present invention.

FIG. 3 is a block diagram showing a functional configuration of voyage management server device 11. Namely, computer 10 that is used as hardware of voyage management server device 11 functions as a device that comprises the components shown in FIG. 3 when it executes data processing in accordance with an application program for voyage management server device 11.

Voyage management server device 11 comprises, as a functional component, storage unit 110 that stores fuel consumption rate data sets, sailing route data sets, and distance data sets in advance. Each of the fuel consumption rate data sets stored in storage unit 110 indicates a fuel consumption rate, for example, fuel consumption per unit sailing distance (ton/mile, etc.), when ship 9 sails in a certain condition that is defined by a combination of a sailing speed, maritime weather conditions, etc. Each of the sailing route data sets stored in storage unit 110 indicates a departure port, visited ports, and a destination port on a sailing route. Each of the distance data sets stored in storage unit 110 indicates a distance between a port and its subsequent port on a sailing route. Storage unit 110 further stores various sorts of data sets such as result data sets transmitted from shipboard terminal device 12, maritime weather data sets transmitted from maritime weather data distribution server device 13, voyage management data sets generated in accordance with input operations made by a user, etc. Details of the voyage management data sets will be explained later.

Figure 4:
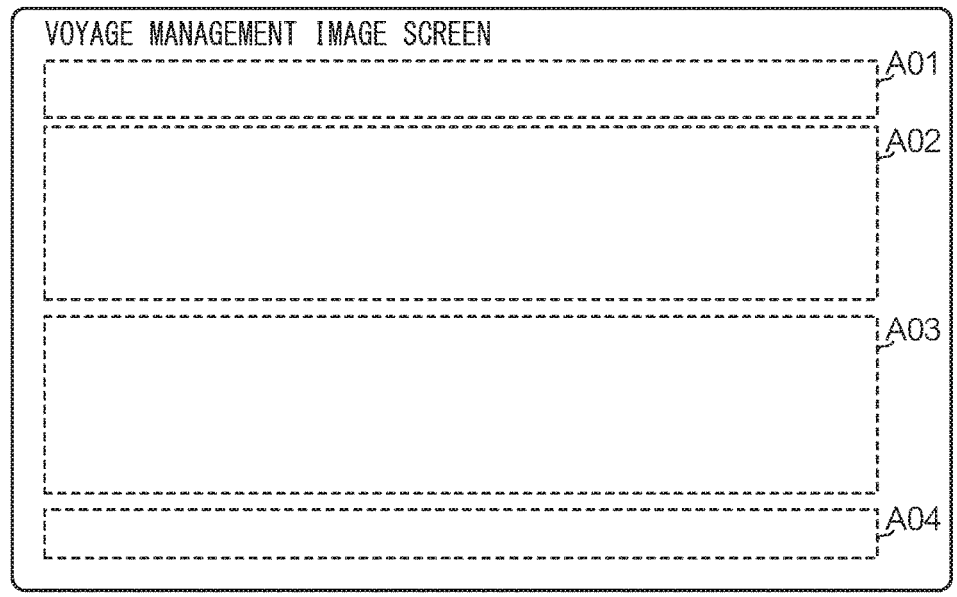
FIG. 4 An exemplary image of a voyage management screen displayed by a voyage management server device according to an exemplary embodiment of the present invention.

Before configurations of data sets stored in storage unit 110 are explained, a screen image where information indicated by data sets stored in storage unit 110 is displayed to a user and data sets to be stored in storage unit 110 are input by a user is explained below. FIG. 4 illustrates an exemplary configuration of the screen image. The screen image of FIG. 4 is referred to as a "voyage management screen image" hereinafter. The voyage management screen is displayed, for example, by a display device connected to voyage management server device 11.

The voyage management screen image is divided into areas A01-A05.

Area A01 is an area where basic information such as a voyage ID identifying a voyage to be managed, etc. and information on a schedule of a voyage that is originally planned (referred to as an "original voyage schedule" hereinafter) are input and displayed.

Area 02 is an area where information on a schedule of the voyage that is currently used (referred to as a "current voyage schedule" hereinafter) is input and displayed.

Area 03 is an area where information on a tentative schedule of the voyage that is a modified version of the current voyage schedule (referred to as a "modified voyage schedule" hereinafter) is input and displayed.

Area A04 is an area where information on a part of the voyage that was already made by ship 9 such as an actual departure time from each port that ship 9 already visited during the voyage, total fuel consumption in accordance with the current voyage schedule, a difference between the total fuel consumption in accordance with the current voyage schedule and total fuel consumption in accordance with the modified voyage schedule, etc. are displayed.

The voyage management screen image contains various objects such as input fields, display fields, operation parts such as operation buttons, graphs, etc.

Figure 5:
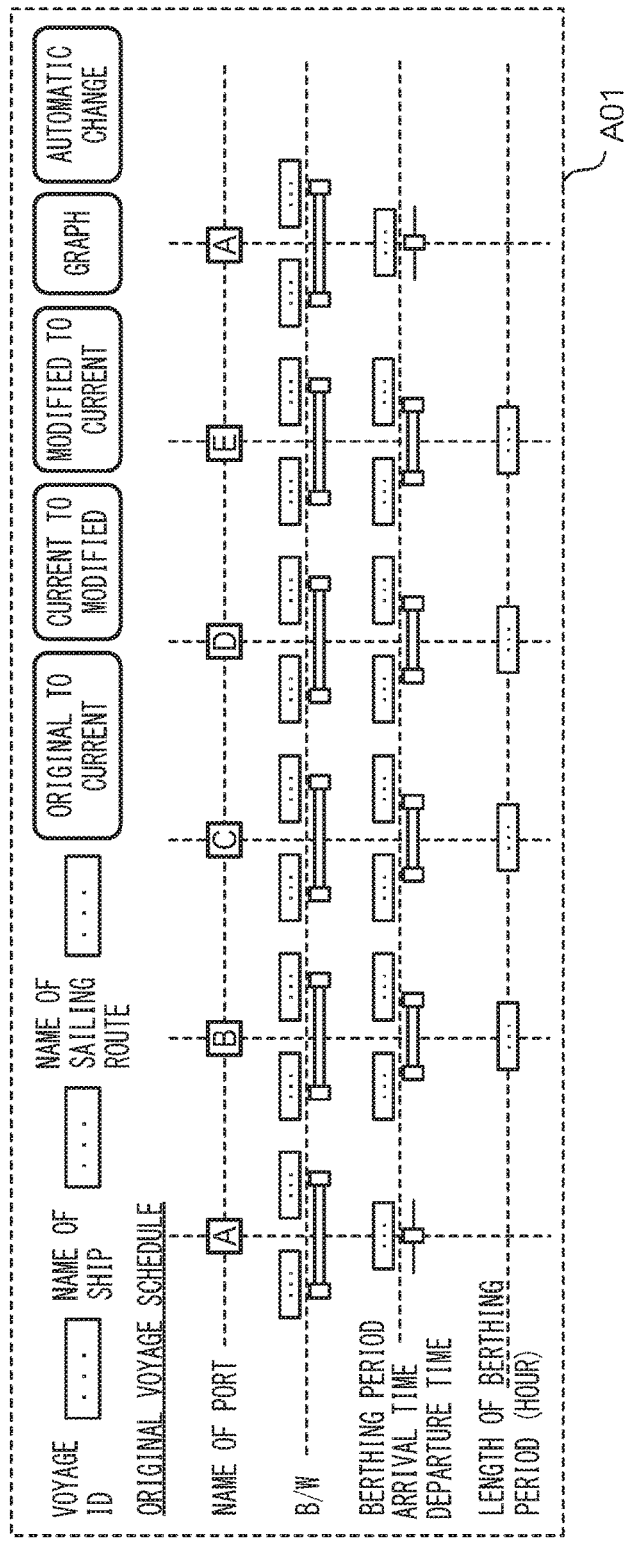
FIG. 5 An exemplary image of a partial area of a voyage management screen displayed by a voyage management server device according to an exemplary embodiment of the present invention.

FIG. 5 illustrates an exemplary image of area A01 of the voyage management screen image. The first line of area A01 contains input fields of a voyage ID identifying a voyage to be managed, a name of a ship making the voyage and a name of a sailing route of the voyage. The first line of area A01 further contains five operation buttons, i.e. "original to current" button, "current to modified" button, "modified to current" button, "graph" button and "automatic modification" button.

"Original to current" button is used by a user when he/she instructs voyage management server device 11 to reflect information on the original voyage schedule, i.e. information displayed in the second line to the fifth line of area A01, to information on the current voyage schedule, i.e. information displayed in the first line and the sixth line to the eighth line of area A02. "Current to modified" button is used by a user when he/she instructs voyage management server device 11 to reflect information on the current voyage schedule, i.e. information displayed in area A02, to information on the modified voyage schedule, i.e. information displayed in area A03. "Modified to current" button is used by a user when he/she instructs voyage management server device 11 to reflect information on the modified voyage schedule, i.e. information displayed in area A03, to information on the current voyage schedule, i.e. information displayed in area A02. "Graph" button is used by a user when he/she instructs voyage management server device 11 to display a screen image containing graphs (referred to as a "graph presentation screen image" hereinafter) that will be explained later.

"Automatic modification" button is used by a user when he/she instructs voyage management server device 11 to modify automatically the current voyage schedule to generate a modified voyage schedule. When the user clicks "automatic modification" button, voyage management server device 11 specifies time periods during which ship 9 stays at ports on a remaining part of the sailing route so that estimated total fuel consumption for the entire voyage should become the least when calculated in view of predetermined conditions, and starting times and ending times of the specified time periods are entered into their corresponding input fields in area A03.

The second line of area A01 contains display fields where names of ports on the sailing route are displayed. A number of the display fields and the names of ports displayed in the fields are automatically determined by voyage management server device 11 based on a voyage data set corresponding to a name of a voyage input in "voyage name" field in the first line of area A01.

The third line to the fifth line of area A01 contain several objects for inputting or displaying information on the original voyage schedule.

The third line of area A01 contains several sets of a left input field, a right input field and a slide bar. Each of the sets corresponds to a port, and objects contained in each set are used for inputting a starting time and an ending time of a berth window (B/W) at the port in an original voyage schedule. A berth window corresponding to a departure port, such as port "A" in voyage "R," means a time period in which ship 9 should leave the departure port. Similarly, a berth window corresponding to a destination port, such as port "A" in voyage "R," means a time period in which ship 9 should arrive at the destination port. A user can input a starting time by typing numbers, etc., into the left input field and input an ending time by typing numbers, etc., into the right input field. The user can modify the starting time by dragging a left knob of the slide bar in the horizontal direction, and an ending time by dragging a right knob of the slide bar in the horizontal direction.

The fourth line of area A01 contains several sets of a left input field, a right input field and a slide bar. Each of the sets corresponds to a visited port, and objects contained in each set are used for inputting a starting time of a berthing period at the port, i.e. an arrival time at the port, and an ending time of the berthing period, i.e. a departure time from the port, in the original voyage schedule. Functions of the objects in the fourth line are the same as those of the objects in the third line.

The fourth line of area A01 further contains two sets of an input field and a knob corresponding to the departure port and the destination port. Objects contained in the set corresponding to the departure port are used for inputting a departure time from the departure port in the original voyage schedule, and objects contained in the set corresponding to the destination port are used for inputting an arrival time at the destination port in the original voyage schedule. The user can input a departure time or an arrival time by typing numbers, etc., into the input field, and modify the time by dragging the knob in the horizontal direction.

The fifth line of area A01 contains several input fields corresponding to visited ports. A length of a berthing period at each visited port in the original voyage schedule is input into each of the input fields. A length of a berthing period is referred to as a "berthing time length" hereinafter. A berthing time length in an input field in the fifth line is changed inter-connectedly with a starting time and an ending time of a berthing period in input fields in the fourth line with regard to each visited port. Namely, when the user changes a starting time of a berthing period at a visited port or an ending time of the berthing period in an input field corresponding to the visited port in the fourth line, a berthing time length in an input field corresponding to the visited port in the fifth line is changed automatically so that consistency between the berthing time length and the berthing period is maintained. Similarly, when the user changes a berthing time length at a visited port in an input field in the fifth line, an ending time of a berthing period in an input field corresponding to the visited port in the fourth line is changed automatically so that consistency between the berthing time length and the berthing period is maintained. However, when the user inputs a berthing time length longer than a time length from a starting time of a berthing period to an ending time of a berth window with regard to a visited port, a starting time of the berthing period is also changed in addition to an ending time of the berthing period so that the berthing period does not go beyond the berth window.

It is not allowed for a berthing period to go beyond a berth window with regard to each port. Accordingly, when a user wishes to change a berthing period beyond a berth window at a visited port, he/she needs to change the berth window before he/she changes the berthing period. When a user changes a starting time of a berth window to a timing later than a starting time of a berthing period, or when the user changes an ending time of the berth window to a timing later than an ending time of the berthing period, the berthing period is automatically shifted so that a length of the berthing period is maintained and the berthing period falls within the berth window.

Figure 6:
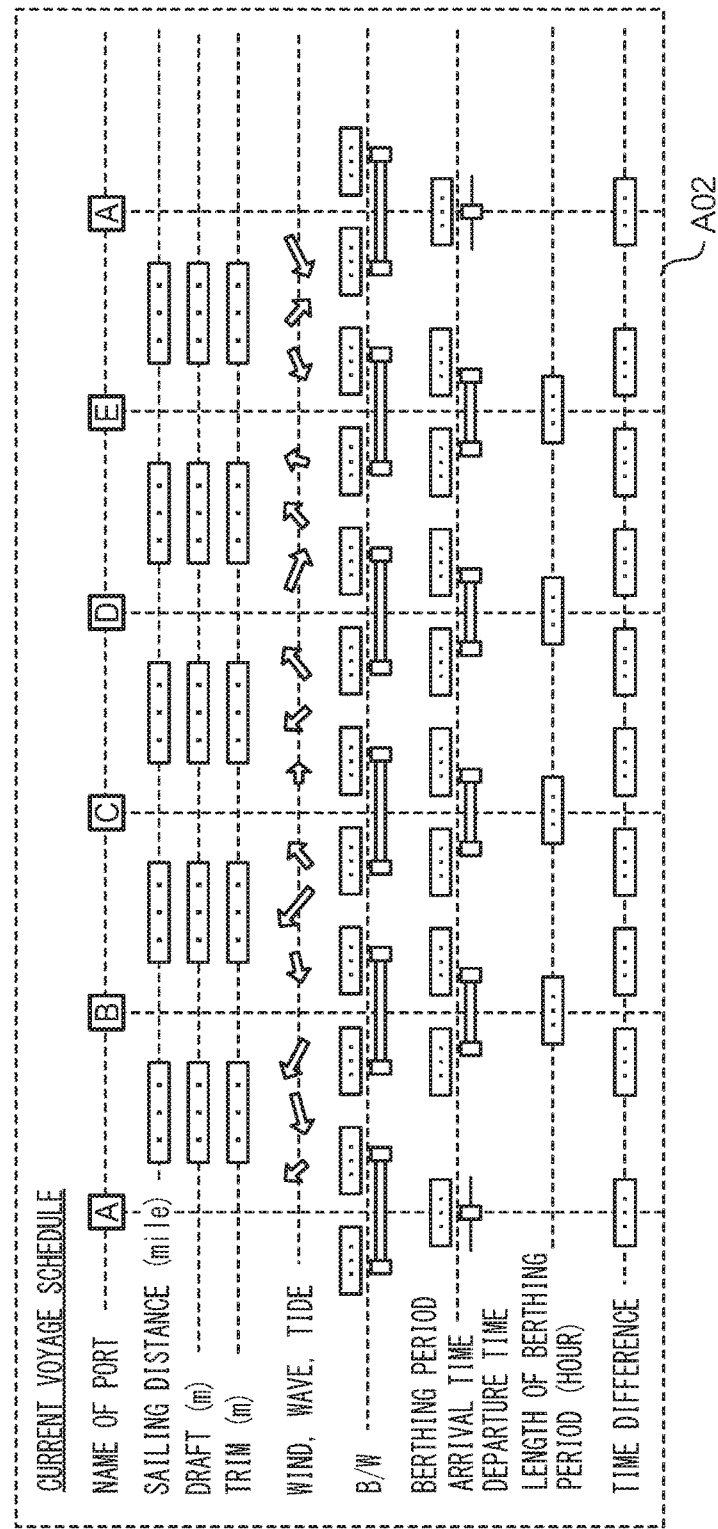
FIG. 6 An exemplary image of a partial area of a voyage management screen displayed by a voyage management server device according to an exemplary embodiment of the present invention.

FIG. 6 illustrates an exemplary image of area A02 of the voyage management screen image. The first line of area A02 contains display fields where names of ports on the sailing route are displayed in the same way as the second line of area A01.

The second line of area A02 contains display fields corresponding to sectional sailing routes, and a sailing distance of a corresponding sectional sailing route is displayed in each of the display fields. Each sailing distance displayed in each of the display fields is automatically set based on the distance data sets corresponding to the names of ports.

Third and fourth line of area A02 contains input fields for drafts and trims of ship 9 corresponding to the sectional sailing routes. A user such as a ship operation manager estimates a draft and a trim of ship 9 in each of the sectional sailing routes based on, for example, a total weight of loaded cargos, etc., and inputs the estimated draft and trim to input fields corresponding to the sectional sailing route.

The fifth line of area A02 contains arrows showing maritime weather conditions in which ship 9 sails with regard to each of the sectional sailing routes. More concretely, three arrows are displayed with regard to each sectional sailing route, and they show conditions of wind, wave, and tide respectively. A direction of a left arrow shows a direction of wind, and a length of the left arrow shows a speed of wind. A direction of a middle arrow shows a direction of wave, and a length of the middle arrow shows a height of wave. A direction of a right arrow shows a direction of tide, and a length of the right arrow shows a speed of tide. In area A02, a sailing direction of ship 9 is assumed to be the right direction, and directions of the arrows show directions of wind, wave, and tide relative to the sailing direction of ship 9.

Maritime weather conditions shown by arrows in the fifth line of area A02 are indicated by maritime weather data sets that voyage management server device 11 acquires from maritime weather data distribution server device 13, and a user cannot input or edit the maritime weather conditions shown in area A02.

The sixth to the eighth lines of area A02 contain the same types of objects as contained in the third to the fifth lines of area A01 respectively. The objects in the sixth to the eighth lines of area A02 display berth windows, berthing periods and lengths of berthing period of a current voyage schedule, and a user can edit them by use of the objects.

The ninth line of area A02 contains display fields for displaying time differences between timings of a current voyage schedule and timings of an original voyage schedule, i.e. a time difference between departure times from each port in a current voyage schedule and in an original voyage schedule, and a time difference between arrival times at each port in the current voyage schedule and in the original voyage schedule. The time differences displayed in the display fields in the ninth line of area A02 are automatically calculated based on departure times and arrival times in the original voyage schedule shown in the fourth line of area A01 and departure times and arrival times in the current voyage schedule shown in the seventh line of area A02.

Figure 7:
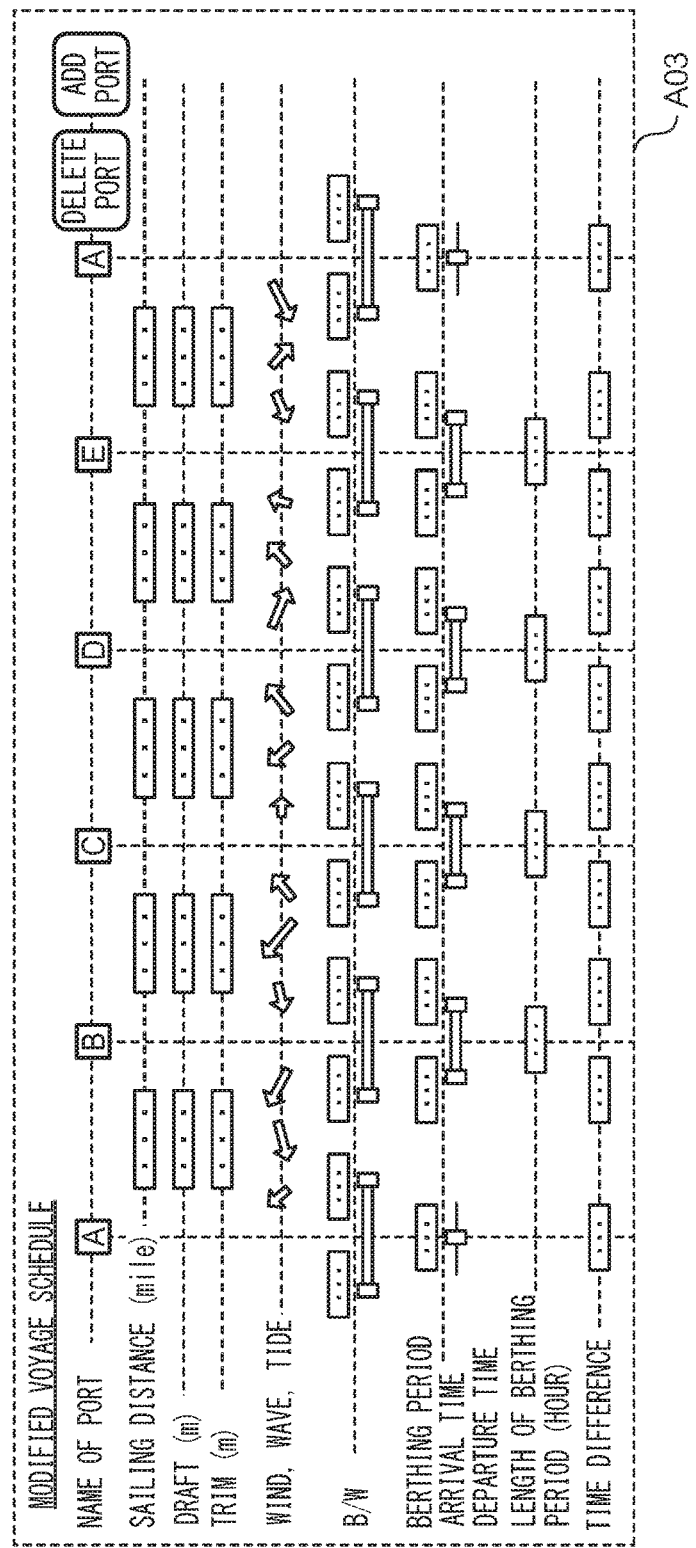
FIG. 7 An exemplary image of a partial area of a voyage management screen displayed by a voyage management server device according to an exemplary embodiment of the present invention.

FIG. 7 illustrates an exemplary image of area A03 of the voyage management screen image. Types of objects and arrangements of the objects in area A03 are the same as those of the objects in area A02 except that "delete port" button and "add port" button, which are not located in area A02, are located at the right end of the first line of area A03. Functions of the objects other than "delete port" button and "add port" button in area A03 are the same as those of the objects in area A02. In area A03, starting times and ending times of berth windows, starting times and ending times of berthing periods, and lengths of berthing periods may be "locked." If a starting time of a berth window or a berthing period, an ending time of a berth window or a berthing period, or a length of a berthing period is locked, the "locked" information is not automatically changed when an automatic change function, whose details are explained later, is executed in response to a click operation made to "automatic change" button in area A01. For example, when a user right-clicks on an input field in area A03 corresponding to any item of the above-mentioned information, a pop-up menu is displayed for selection of "lock" button or "unlock" button. After the user clicks on "lock" button in the pop-up menu, the information corresponding to the input field is not changed when the automatic change function is executed, and after the user clicks on "unlock" button in the pop-up menu, the information corresponding to the input field may be changed when the automatic change function is executed. Each of the input fields is displayed in different types of appearance when it is locked and unlocked such that a line of the input field is displayed in a different color.

For example, when it is allowed for an arrival time at a destination port of a voyage to be delayed by up to 12 hours from an arrival time at the destination port of the voyage in an original voyage schedule, a user such as a ship operation manager may change an ending time of a berth window of the destination port in the sixth line of area A03 to a timing that is 12 hours later than the arrival time at the destination port in the original voyage schedule, and lock the changed arrival time. Then, if the user clicks on "automatic change" button, the automatic change function is executed and information on a modified voyage schedule is automatically set in area A03 so that the locked information, i.e. the arrival time at the destination after the change, is not changed. As a result, a modified voyage schedule that is made under a condition that its arrival time at the destination port must be earlier than 12 hours later than the arrival time at the destination port in the original voyage schedule is presented to the user.

"Delete port" button is used for deleting a visited port on a sailing route in a modified voyage schedule. A user can delete any port other than the departure port and the destination port from ports on a sailing route by selecting a name of the port in the first line by clicking a display field of the name and clicking "delete port" button.

For example, it is assumed that the fourth port is port "D" on a sailing route when a departure port is the first port, and port "D" is deleted from ports on the sailing route. In this case, the fifth port and the sixth port become the fourth port and the fifth port respectively on a sailing route in a modified voyage schedule. Namely, objects related to port "D" disappear from area A03, and objects related to port "E" and port "A" (as a destination port) move to positions of objects related to the fourth port and the fifth port respectively. At the same time, a distance between the third port (port "C") and the fourth port (port "E") is updated based on the distance data sets. Moreover, arrows indicating maritime weather conditions, i.e. conditions of wind, wave and tide, corresponding to a sectional sailing route from the third port to the fourth port are updated based on maritime weather data sets newly acquired from maritime weather data distribution server device 13. With regard to a draft and a trim, a draft and a trim corresponding to a sectional sailing route from the third port (port "C") to the fourth port (port "D") before port "D" is deleted are set as a draft and a trim corresponding to a new sailing route from the third port (port "C") to the fourth port (port "E") after port "D" is deleted.

"Add port" button is used for adding a port on a sailing route in a modified voyage schedule. A user can add a port before any port on a sailing route other than the departure port by selecting a name of a port in the first line by clicking a display field of the name and clicking "add port" button.

For example, it is assumed that a user selects the fourth port, i.e. port "D," and clicks "add port" button. In this case, objects related to ports "D," "E" and "A" (as the destination port) in area A03 move to the right, and objects related to the added port appear at the positions of objects related to the fourth port. Among the newly added objects, a display field in the first line is editable by a user just after the new port is added to the sailing route. It is assumed that a user inputs "X" to the display field as a name of the added port. In response to the input of the name of the added port, a distance from the third port (port "C") to the fourth port (port "X") and a distance from the fourth port (port "X") to the fifth port (port "D") are updated based on the distance data sets. Moreover, arrows indicating maritime weather conditions, i.e. conditions of wind, wave, and tide, corresponding to a sectional sailing route from the third port to the fourth port and a sectional sailing route from the fourth port to the fifth port are updated based on maritime weather data sets newly acquired from maritime weather data distribution server device 13. With regard to a draft and a trim, a draft and a trim corresponding to a sectional sailing route from the third port (port "C") to the fourth port (port "D") before port "X" is added are set as a draft and a trim corresponding to a new sectional sailing route from the third port (port "C") to the fourth port (port "X") and a new sectional sailing route from the fourth port (port "X") to the fifth port (port "D") after port "X" is added.

Just after a new port is added on a sailing route, input fields of a starting time and an ending time of a berth window, a starting time and an ending time of a berthing period and a length of the berthing period related to the added port are blank. Accordingly, after a user adds a port on a sailing route, he/she is required to input data in these input fields to complete a modified voyage schedule.

Moreover, a user can change an order of ports on a sailing route by dragging in a horizontal direction any display field of a name of a port other than the departure port and the destination port in the first line of area A03. When an order of ports on a sailing route is changed, data related to sectional sailing routes affected by the change of the order of ports are updated in a similar way to the case where a port is deleted from or added to a sailing route.

Figure 8:
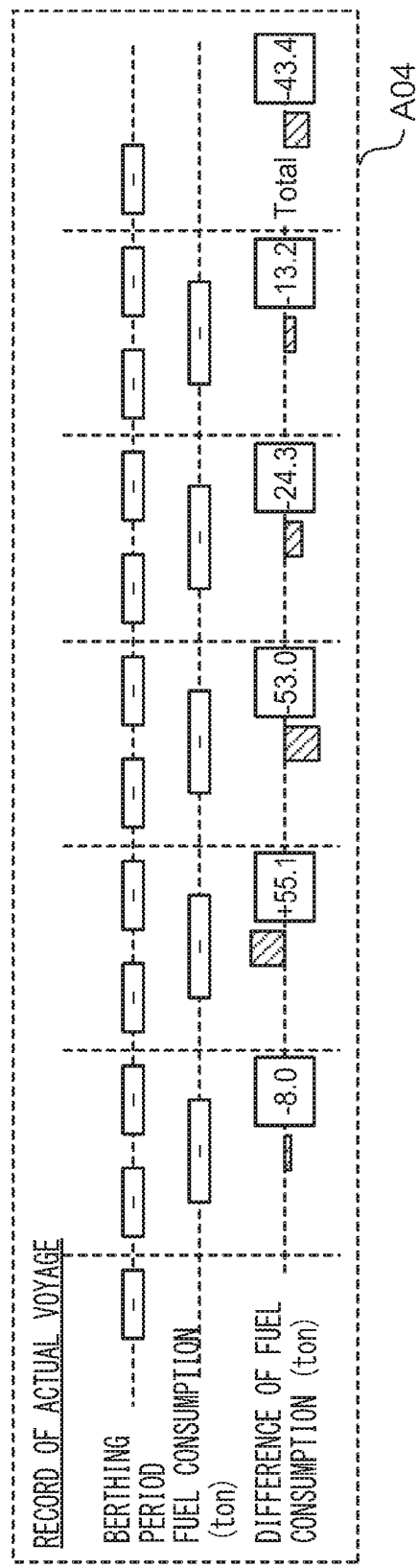
FIG. 8 An exemplary image of a partial area of a voyage management screen displayed by a voyage management server device according to an exemplary embodiment of the present invention.

FIG. 8 illustrates an exemplary image of area A04 of the voyage management screen image. The first line of area A04 contains display fields where actual starting times and actual ending times of berthing periods, i.e. times when ship 9 actually departed from ports and times when ship 9 actually arrived at ports, during the voyage are displayed. The second line of area A04 contains display fields where actual fuel consumption by ship 9 on each sectional sailing route during the voyage is displayed. Data sets displayed in these display fields are automatically updated based on results data sets that voyage management server device 11 receives from shipboard terminal device 12, and a user cannot edit the data sets. Before ship 9 arrives at a port, a display field of a starting time of a berthing period in the first line corresponding to the port is kept blank. Before ship 9 departs from a port, a display field of an ending time of a berthing period in the first line corresponding to the port is kept blank. Before ship 9 starts to sail on a sectional sailing route, a display field of fuel consumption in the second line corresponding to the sectional sailing route is kept blank. While ship 9 is sailing on a sectional sailing route, actual fuel consumption by ship 9 for sailing from the starting location of the sectional sailing route to the current location of ship 9 is displayed.

The third line of area A04 contains bar graphs and numbers indicating differences between fuel consumption by ship 9 to make a voyage in accordance with a current voyage schedule and fuel consumption by ship 9 to make a voyage in accordance with a modified voyage schedule with regard to each sectional sailing route and an entire sailing route. Data sets indicated by objects displayed in the third line of area A04 are automatically calculated by voyage management server device 11 based on data sets displayed in area A02 and area A03, and a user cannot edit the data sets.

A user can set data sets related to an original voyage schedule by making input operations to objects in the second line to the fifth line of area A01. After a user sets data sets related to an original voyage schedule in area A01, he/she can copy data sets related to the original voyage schedule as data sets related to a current voyage schedule by clicking "original to current" button in area A01. The copied data sets are reflected to objects in area A02.

A user can copy data sets related to a current voyage schedule indicated by objects in area A02 as data sets related to a modified voyage schedule by clicking "current to modified" button in area A01. The copied data sets are reflected to objects in area A03. As a result, data sets related to a modified voyage schedule are initialized. After the initialization, the user can edit the modified voyage schedule by making input operations to objects in area A03.

When a user edits a modified voyage schedule, he/she can check a difference between fuel consumption required for a voyage in accordance with a current voyage schedule and fuel consumption required for a voyage in accordance with a modified voyage schedule displayed in the third line of area A04. Accordingly, a user can plan a modified voyage schedule considering costs of a voyage. Moreover, when a user edits a modified voyage schedule, he/she can check a difference between a departure time from a port in an original voyage schedule and a departure time from the port in the modified voyage schedule, and a difference between an arrival time at the port in the original voyage schedule and an arrival time at the port in the modified voyage schedule displayed in the eighth line of area A03. Accordingly, a user can plan a modified voyage schedule considering feasibility of changes in a time schedule of the modified voyage schedule.

A user usually repeatedly makes input operations to objects in area A03 until a preferable modified voyage schedule is determined, and copies data sets related to the preferable modified voyage schedule as data sets related to a new current voyage schedule by clicking "modified to current" button in area A01. The copied data sets are reflected to objects in area A02. As a result, a current voyage schedule is modified.

Figure 9:
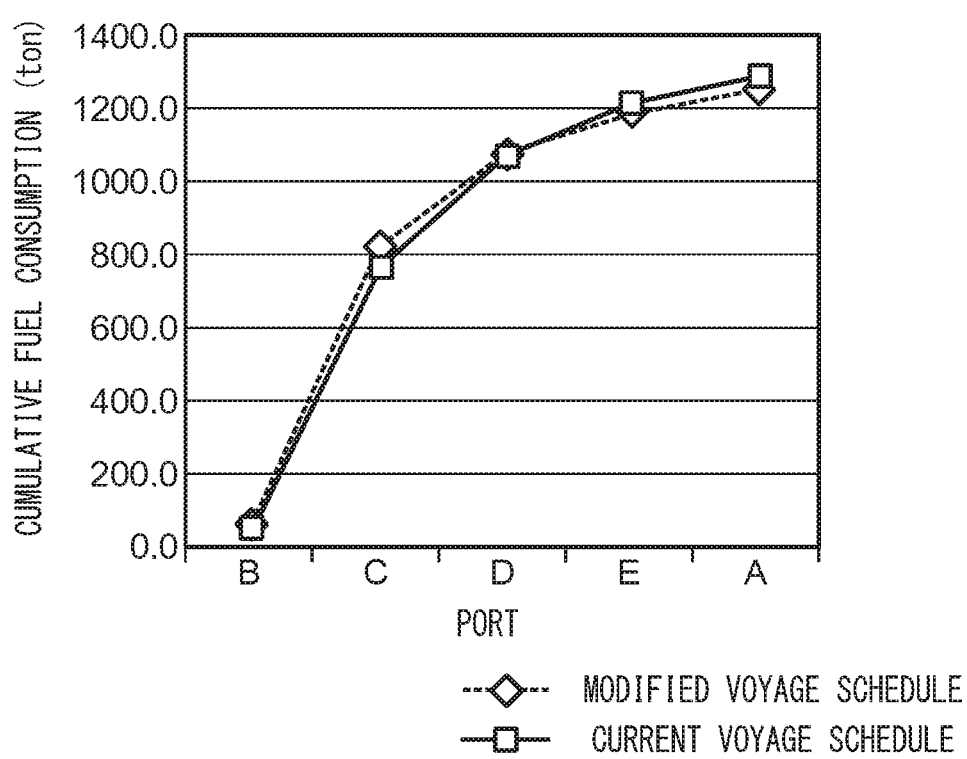
FIG. 9 An exemplary image of a graph presentation screen displayed by a voyage management server device according to an exemplary embodiment of the present invention.

When a user clicks "graph" button in area A01, a screen image showing graphs as illustrated in FIG. 9 pops up. A screen image as illustrated in FIG. 9 is referred to as a "graph presentation screen image" hereinafter. In the graph presentation screen image, polygonal line graphs with regard to a current voyage schedule and a modified voyage schedule that indicate cumulative fuel consumption when ship 9 arrives at each port on a sailing route are displayed. At any time when a user wishes to refer to the graphs while he/she is making a modified voyage schedule, he/she can open the graph presentation screen image.

Explanation of the voyage management screen image is now finished, and explanation of various data stored in storage unit 110 of voyage management server device 11 is described below.

FIG. 10A and FIG. 10B illustrate an exemplary structure of voyage management data sets. Voyage management data sets are stored in a table of voyage information of each sectional sailing route (FIG. 10A) and a table of voyage information of each port (FIG. 10B). In these tables, each of data sets displayed in the voyage management screen image is stored in its corresponding data field (column) of its corresponding data record (line).

FIG. 11 illustrates an exemplary structure of a sailing route table. The sailing route table contains plural sailing route data sets each indicating a sailing route. Each sailing route data set contains a name of a sailing route that identifies a sailing route and a series of names of ports that indicate ports on the sailing route in the order to be visited by ship 9 such as "A-B-C-D-E-A" indicating the sailing route of voyage "R."

FIG. 12 illustrates an exemplary structure of a distance table. The distance table contains plural distance data sets each indicating a distance between two ports. Each distance data set indicates a combination of two consecutive ports such as "A-B" and a distance between the ports.

FIG. 13 illustrates an exemplary structure of a table of fuel consumption rate for each sailing condition. The table of fuel consumption rate for each sailing condition contains plural fuel consumption rate data sets as data records. Each fuel consumption rate data set contains data sets indicating various sorts of parameters that affect a sailing condition such as a wind speed, a wind direction, a wave height, a wave direction, a tide speed, a tide direction, a draft and a trim. Each fuel consumption rate data set further contains data sets indicating a sailing speed and a fuel consumption rate. Each fuel consumption rate data set indicates a fuel consumption rate required for ship 9 to sail at a sailing speed in a sailing condition defined by a combination of the above-mentioned parameters such as a wind speed, etc.

Fuel consumption rate data sets are generated by, for example, inputting various combinations of parameters, such as a wind direction and a sailing speed, to a physical simulation model of ship 9 realized by a computer, and recording fuel consumption rates output from the model together with the input parameters. Since use of a physical simulation model of a ship is a known technique, explanation of the model is omitted in this specification.

FIG. 14 illustrates an exemplary structure of a maritime weather data set that is transmitted from maritime weather data distribution server device 13 in response to a transmission request from voyage management server device 11. A maritime weather data set received by voyage management server device 11 is stored in the voyage management data sets as illustrated in FIG. 10A. As already explained, a maritime weather data set indicates parameters affecting a sailing condition such as a wind speed, a wind direction, a wave height, etc., in a certain time period either in the past or in the future in a certain sea area. Maritime weather data distribution server device 13 manages a database that stores maritime weather data sets with regard to various combinations of a time period and a sea area. When maritime weather data distribution server device 13 receives a transmission request that indicates a certain time period and a certain sea area from voyage management server device 11, it transmits a maritime weather data set corresponding to a combination of the certain time period and the certain sea area indicated by the transmission request to voyage management server device 11.

FIG. 15 illustrates an exemplary structure of result data sets that are transmitted from shipboard terminal device 12 to voyage management server device 11 and stored in the voyage management data sets as illustrated in FIG. 10A and FIG. 10B. The result data sets contain data sets each indicating a draft and a trim when ship 9 sails in a sectional sailing route (FIG. 15(a)), which are transmitted from shipboard terminal device 12 to voyage management server device 11 before ship 9 departs from each port. The result data sets also contain data sets each indicating a departure time of ship 9 from a port (FIG. 15(b)), which are transmitted from shipboard terminal device 12 to voyage management server device 11 when ship 9 departs from each port. The result data sets also contain data sets each indicating accumulative fuel consumption that is required for ship 9 to sail from a departure port to a current position of ship 9 and an accumulative sailing distance from a location of the departure port to a current location of ship 9 (FIG. 15(c)), which are transmitted from shipboard terminal device 12 to voyage management server device 11 at unit time intervals during the voyage. The result data sets further contain data sets each indicating an arrival time of ship 9 at a port (FIG. 15(d)), which are transmitted from shipboard terminal device 12 to voyage management server device 11 when ship 9 arrives at each port.

The data sets indicating drafts and trims (FIG. 15(a)) are, for example, data sets that a user of shipboard terminal device 12 such as a ship's navigator specifies by checking draft gauges located at a bow and a stem of ship 9 when, for example, cargo handling operations are completed at each port and inputs to shipboard terminal device 12. When a user inputs a data set indicating a draft and a trim at a port, he/she also inputs a name of the port and a name of a subsequent port on a sailing route to shipboard terminal device 12 as data indicating a sectional sailing route such as "A-B," meaning a sectional sailing route from port "A" to port "B," on which ship 9 sails with the draft and the trim input by the user.

The data sets indicating departure times (FIG. 15(b)) are, for example, data sets that a user of shipboard terminal device 12 such as a ship's navigator inputs to shipboard terminal device 12 when ship 9 departs from each port. When a user inputs a departure time, he/she also inputs a name of a port from which ship 9 departs such as "A" meaning port "A."

The data sets indicating fuel consumptions and sailing distances (FIG. 15(c)) are, for example, data sets automatically generated and input to shipboard terminal device 12 by sensors on ship 9, and indicate accumulative fuel consumptions and accumulative sailing distances measured by the sensors at unit time intervals as well as timings when the measurements are performed.

The data sets indicating arrival times (FIG. 15(d)) are, for example, data sets that a user of shipboard terminal device 12 such as a ship's navigator inputs to shipboard terminal device 12 when ship 9 arrives at each port. When a user inputs an arrival time, he/she also inputs a name of a port at which ship 9 arrives such as "B" meaning port "B."

Explanation of various data stored in storage unit 110 is now finished, and explanation of functional components of voyage management server device 11 is continued below referring to FIG. 3.

Voyage management server device 11 comprises, as a functional component, acquisition unit 111 that acquires result data sets transmitted from shipboard terminal device 12, maritime weather data sets transmitted from maritime weather data distribution server device 13, and data sets (referred to as "modification instruction data sets" hereinafter) input by a user of voyage management server device 11 by making input operations to objects in the voyage management screen image. Acquisition unit 111 instructs storage unit 110 to store the acquired data sets as voyage management data sets. Moreover, acquisition unit 111 reads out data sets stored in the table of fuel consumption rates for each sailing condition and data sets contained in the voyage management data sets (including data sets modified by modifying unit 115, which is explained later) from storage unit 110.

Voyage management server device 11 comprises, as a functional component, calculation unit 112 that calculates fuel consumption required for ship 9 to sail for each of the sectional sailing routes and an entire sailing route in each case where ship 9 sails in accordance with a current voyage schedule and a modified voyage schedule based on various data sets acquired by acquisition unit 111.

Calculation unit 112 comprises speed calculation unit 1121 that calculates a sailing speed at which ship 9 sails on each of the remaining sectional sailing routes, sectional fuel consumption calculation unit 1122 that calculates fuel consumption required for ship 9 to sail on each of the sectional sailing routes, total fuel consumption calculation unit 1123 that calculates fuel consumption required for ship 9 to sail on the entire sailing route of the voyage, and comparing unit 1124 that compares fuel consumption in a current voyage schedule and fuel consumption in a modified voyage schedule, or fuel consumption in each of different modified voyage schedules.

Speed calculation unit 1121 calculates, with regard to each of sectional sailing routes that have not been sailed by ship 9 yet, a sailing speed at which ship 9 sails on the sectional sailing route by dividing a sailing distance of the sectional sailing route indicated by a data set stored in the table of voyage information of each sectional sailing route (FIG. 10A) by a length of a sailing time on the sectional sailing route. A length of a sailing time of a sectional sailing route is determined as a time length between an ending time of a berthing period of a port at a starting location of the sailing route indicated by a data set stored in the table of voyage information of each port (FIG. 10B) (or a current time with regard to a sectional sailing route on which ship 9 is currently sailing) and a starting time of a berthing period of a subsequent port indicated by a data set stored in the table of voyage information of each port (FIG. 10B).

Sectional fuel consumption calculation unit 1122 specifies, with regard to each of sectional sailing routes on which ship 9 is currently sailing or ship 9 has not sailed yet, a fuel consumption rate corresponding to a combination of parameters of maritime weather conditions such as a wind speed, a wind direction, etc., a draft, a trim, and a sailing speed indicated by a voyage management data set stored in the table of voyage information of each sectional sailing route (FIG. 10A) based on the fuel consumption rate data sets (FIG. 13). Next, sectional fuel consumption calculation unit 1122 calculates a remaining sailing distance of a sectional sailing route that ship 9 is currently sailing, i.e. a distance between a current location of ship 9 and a location of a destination port of the sectional sailing route, and calculates fuel consumption required for ship 9 to sail the remaining distance of the sectional sailing route by multiplying the specified fuel consumption rate by the calculated remaining sailing distance. Moreover, sectional fuel consumption calculation unit 1122 calculates, with regard to each of sectional sailing routes on which ship 9 has not sailed yet, fuel consumption required for ship 9 to sail on the sectional sailing route by multiplying the specified fuel consumption rate by a sailing distance of the sectional sailing route indicated by a voyage management data set stored in the table of voyage information of each sectional sailing route (FIG. 10A). Fuel consumption calculated by sectional fuel consumption calculation unit 1122 is referred to as "sectional fuel consumption" hereinafter.

Total fuel consumption calculation unit 1123 calculates fuel consumption required for ship 9 to sail a remaining distance of the voyage by summing fuel consumption calculated by sectional fuel consumption calculation unit 1122 with regard to each of sectional sailing routes on which ship 9 is currently sailing or ship 9 has not sailed yet. Then, total fuel consumption calculation unit 1123 calculates total fuel consumption required for ship 9 to sail on the entire sailing route by adding the calculated fuel consumption required for ship 9 to sail the remaining distance of the voyage to fuel consumption that has already been used by ship 9 in the voyage. Fuel consumption that has already been used by ship 9, i.e. fuel consumption used for ship 9 to sail from a location of the departure port to a current location (a reference location) of ship 9, is referred to as "actual fuel consumption to a reference location" hereinafter.

Comparing unit 1124 calculates, with regard to each sectional sailing route, a change of fuel consumption when ship 9 sails in accordance with a modified voyage schedule instead of the original voyage schedule by subtracting fuel consumption when ship 9 sails in accordance with an original voyage schedule calculated by sectional fuel consumption calculation unit 1122 from fuel consumption when ship 9 sails in accordance with a modified voyage schedule calculated by sectional fuel consumption calculation unit 1122. Moreover, comparing unit 1124 calculates a change of total fuel consumption when ship 9 sails in accordance with a modified voyage schedule instead of the original voyage schedule by subtracting total fuel consumption when ship 9 sails in accordance with an original voyage schedule calculated by total fuel consumption calculation unit 1123 from fuel consumption when ship 9 sails in accordance with a modified voyage schedule calculated by total fuel consumption calculation unit 1123. These changes in fuel consumption calculated by comparing unit 1124 are shown in the third line of area A04 (FIG. 8) of the voyage management screen image.

Moreover, voyage management server device 11 comprises, as a functional component, data generating unit 113 that generates data sets indicating various sorts of values calculated by calculation unit 112. Data generating unit 113 generates, for example, data sets instructing a display device to display a voyage management screen image (FIG. 4) or a graph presentation screen image (FIG. 9) by use of values calculated by calculation unit 112. A format of a data set generated by data generating unit 113 may be, for example, an image data format and/or a text data format such as an HTML data format.

Moreover, voyage management server device 11 comprises, as a functional component, output unit 114 that outputs data sets generated by data generating unit 113 to an external device. Output unit 114 may output an image data set to a display device connected to voyage management server device 11. Alternatively, output unit 114 may output a text data set indicating a text described in a markup language such as HTML to a Web browser application executed in voyage management server device 11. In this case, the Web browser application interprets the text data set to generate an image data set, and the image data set is output to a display device connected to voyage management server device 11. Then, a user of voyage management server device 11 such as a ship operation manager can check information indicated by the data sets output to the display device.

Output unit 114 may also output data sets generated by data generating unit 113 to shipboard terminal device 12 via communication I/F 103 and communication satellite 8. In this case, the data sets output by output unit 114 are received by shipboard terminal device 12, and converted by a Web browser application executed in shipboard terminal device 12 into an image data set. The image data set is output to a display device connected to shipboard terminal device 12. Then, a user of shipboard terminal device 12 such as a ship's navigator can check information indicated by the data sets output to the display device.

Moreover, voyage management server device 11 comprises, as a functional component, modifying unit 115 that modifies voyage management data sets stored in storage unit 110. When an input operation is made by a user to an object in the voyage management screen image for changing a value shown in the image, acquisition unit 111 acquires a modification instruction data set indicating the change of the value, and modifying unit 115 updates a voyage management data set in accordance with the modification instruction data set. Moreover, when acquisition unit 111 acquires a maritime weather data set (FIG. 13) from maritime weather data distribution server device 13 or a result data set (FIG. 15) from shipboard terminal device 12, modifying unit 115 updates a voyage management data set using the acquired data set.

Acquisition unit 111 may acquire a maritime weather data set from maritime weather data distribution server device 13 each time a user makes an input operation to an object in the voyage management screen image for changing a time schedule of a modified voyage schedule, as well as at predetermined time intervals such as every 30 minutes.

When modifying unit 115 updates a voyage management data set in accordance with a modification instruction data set or by use of a maritime weather data set or a result data set, calculation unit 112 recalculates fuel consumption with regard to each sectional sailing route and the entire sailing route for each case when ship 9 sails in accordance with a current voyage schedule and when ship 9 sails in accordance with a modified voyage schedule based on the updated voyage management data set. Then, data generating unit 113 generates a data set indicating an updated version of the voyage management screen image or an updated version of the graph presentation screen image and outputs the data set to a display device. As a result, contents of the voyage management screen image or the graph presentation screen image are updated.

When the automatic change function is executed, modifying unit 115 generates various tentative modified voyage schedules with different combinations of berthing periods by, for example, repeatedly selecting a berthing period from among berthing periods in a current voyage schedule in accordance with a predetermined rule and shifting a starting time or an ending time of the selected berthing period by a time length determined in accordance with a predetermined rule under conditions that no berthing period goes beyond its corresponding berth window and no starting time or ending time that is locked by a user is shifted. Modifying unit 115 generates voyage management data sets for each of the tentative modified voyage schedules, and instructs storage unit 110 to store them.

When the automatic change function is executed, acquisition unit 111 acquires, with regard to each of the tentative modified voyage schedules generated by modifying unit 115, maritime weather data sets corresponding to combinations of time periods and sea areas indicated by voyage management data sets for the tentative voyage schedule from maritime weather data distribution server device 13. Modifying unit 115 updates the voyage management data sets for the tentative voyage schedule by use of the acquired maritime weather data sets.

When the automatic change function is executed, calculation unit 112 calculates total fuel consumption, with regard to each of the tentative modified voyage schedules generated by modifying unit 115, based on voyage management data sets corresponding to the tentative modified voyage schedule. Comparing unit 1124 of calculation unit 112 compares total fuel consumption calculated by total fuel consumption calculation unit 1123 with regard to each of the tentative modified voyage schedules to specify the least total fuel consumption.

Modifying unit 115 updates the original voyage management data sets so that contents of the voyage management data sets corresponding to the tentative modified voyage schedule that results in the least total fuel consumption are reflected to the original voyage management data sets. As a result, a combination of berthing periods that seems preferable from the viewpoint of reduction of total fuel consumption is displayed as a time schedule of a modified voyage schedule in area A03 of the voyage management screen image.

As explained above, according to berthing-time determination support system 1, a user such as a ship operation manager and ship's navigator can easily know how much fuel consumption changes when a current voyage schedule is modified by making input operations to objects in the voyage management screen image, such as an operation to drag a left end or a right end of a slide bar in the seventh line of area A03, at any time either before or after ship 9 starts a voyage in which ship 9 visits several ports. In the ninth line of area A03 of the voyage management screen image, a time difference between an arrival time at a port, i.e. a starting time of a berthing period of the port, in an original voyage schedule and an arrival time at the port in a modified voyage schedule, or a time difference between a departure time from a port, i.e. an ending time of a berthing period of the port, in an original voyage schedule and a departure time from the port in a modified voyage schedule is automatically displayed. As a result, a user can easily judge whether the time schedule in the modified voyage schedule is acceptable.

Moreover, when the automatic change function is executed, a combination of berthing periods that is preferable from the viewpoint of reduction of total fuel consumption is automatically presented to a user. A user can lock any starting time or ending time of a berthing period or a berth window in a modified voyage schedule so the locked time should not be automatically changed when the automatic change function is executed.

Namely, according to berthing-time determination support system 1, a user can specify a preferable combination of berthing times in a voyage schedule from the viewpoint of reduction of total fuel consumption under various conditions.

[Modifications]

The above described embodiment may be variously modified within a scope of the technical idea of the present invention. Some modifications of the embodiment are explained below as examples.

(1) In the above explained embodiment, fuel consumption rate data sets are generated by a physical simulation model of ship 9. A method of generating fuel consumption rate data sets is not limited to the method using a physical simulation model. For example, fuel consumption rate data sets may be generated by statistical analysis of a relationship between parameters of sailing conditions and fuel consumption rates by use of parameters and fuel consumption measured during voyages that ship 9 actually made in the past. Alternatively, for example, fuel consumption rate data sets may be generated by modifying data sets generated by a physical simulation model of ship 9 based on results of statistical analysis using parameters and fuel consumption measured during voyages that ship 9 actually made in the past.

(2) In the above explained embodiment, fuel consumption rate data sets are stored in the table in the format shown in FIG. 13. A format of fuel consumption rate data sets is not limited to the format shown in FIG. 13, and any type of data set indicating a relationship between parameters of sailing conditions including a sailing speed and fuel consumption rates may be used. For example, a data set indicating a function for representing a fuel consumption rate having parameters such as a wind speed, a sailing speed, etc., as variables may be used as a fuel consumption rate data set in the present invention.

(3) In the above explained embodiment, each of fuel consumption rate data sets (FIG. 13) and maritime weather data sets (FIG. 14) indicates a wind speed, a wind direction, a wave height, etc. as parameters of maritime weather conditions. Any other sort of parameter of maritime weather condition such as a wave period may be used in the present invention. Moreover, any sort of parameter that does not relate to maritime weather but affects fuel consumption rate of ship 9, such as a degree of ship hull fouling and a degree of propeller fouling, may be used in the present invention. Moreover, parameters of maritime weather conditions may not be used in the present invention. When any parameter of a maritime weather condition is not used, berthing-time determination support system 1 may not comprise maritime weather data distribution server device 13.

(4) In the above explained embodiment, a sectional sailing route, for which a length of sailing time, a sailing distance, a sailing speed, sectional fuel consumption, etc. are specified, is defined as a sailing route from a port to its subsequent port on a sailing route. Alternatively, a sailing route from a port to its subsequent port may be divided into plural sectional sailing routes, for each of which a length of sailing time, a sailing distance, a sailing speed, sectional fuel consumption, etc. may be specified. In this case, for example, parameters of maritime weather conditions are specified with regard to each sectional sailing route that is shorter than a sectional sailing route in the above explained embodiment. Accordingly, fuel consumption in a voyage can be determined with a higher accuracy in this case than in the case of the above explained embodiment.

(5) In the present invention, either a speed over the ground or a speed through the water may be used as a sailing speed. In the present invention, either fuel consumption per unit sailing distance (ton/mile) or fuel consumption per unit time length (ton/day) may be used as fuel consumption rate.

(6) In the above explained embodiment, fuel consumption rate data sets, sailing route data sets and distance data sets are stored in storage unit 110 of voyage management server device 11 in advance. Alternatively, acquisition unit 111 of voyage management server device 11 may acquire these data sets from a storage device that is connected to voyage management server device 11 directly or via a network each time they are used.

(7) In the above explained embodiment, voyage management server device 11 and shipboard terminal device 12 are configured as different devices from one another. Alternatively, voyage management server device 11 and shipboard terminal device 12 may be integrated and realized by a single device located, for example, on ship 9. In this case, data processing of voyage management server device 11 is executed on ship 9. In the above explained embodiment, maritime weather data distribution server device 13 is configured as a device different from voyage management server device 11. Alternatively, maritime weather data distribution server device 13 and voyage management server device 11 may be integrated and realized by a single device.

(8) In the above explained embodiment, a current location of ship 9 during a voyage may be specified based on an accumulated sailing distance indicated by a result data set and a sailing distance of each sectional sailing route indicated by voyage management data sets. Any other method of specifying a current location of ship 9 may be used in the present invention. For example, if ship 9 has a GPS device, shipboard terminal device 12 may transmit a data set indicating a combination of a latitude and a longitude of a current position of ship 9 measured by the GPS device to voyage management server device 11 as a result data set, and voyage management server device 11 may specify, for example, a remaining sailing distance based on the data set received from shipboard terminal device 12. For the purpose of calculating fuel consumption, it is sufficient that a remaining sailing distance is specified, and it is not necessary for a current location of ship 9 to be specified. Accordingly, shipboard terminal device 12 may calculate a remaining sailing distance of, for example, a sectional sailing route on which ship 9 is currently sailing, and transmit a data set indicating the calculated remaining sailing distance to voyage management server device 11 instead of a data set indicating a current location of ship 9. Alternatively, a user of shipboard terminal device 12 such as a ship's navigator may manually input a remaining sailing distance of, for example, a sectional sailing route on which ship 9 is currently sailing, and shipboard terminal device 12 may transmit a data set indicating the remaining sailing distance to voyage management server device 11.

(9) In the above explained embodiment, voyage "R" is a return voyage in which a departure port and a destination port are the same port, i.e. port "A." A type of voyage is not limited to a return voyage, and any type of voyage may be handled by berthing-time determination support system 1.

(10) In the above explained embodiment, a berthing period at a port includes a time period used for ship handling at the port. Alternatively, a time period used for ship handling in a port may be included in a sailing period, or it may be distributed between sailing period and a berthing period at a certain ratio.

(11) In the above explained embodiment, when the automatic change function is executed, a combination of berthing periods that results in the least total fuel consumption is presented as a time schedule of a modified voyage schedule. Any rule may be used for selecting a preferable combination of berthing periods in the automatic change function. Namely, any objective function and any constraint condition may be used for selecting a preferable combination of berthing periods in the automatic change function. For example, a combination of berthing periods that results in the earliest arrival time at the destination port under a condition that it causes total fuel consumption that is equal to or less than a threshold value designated by a user may be selected as a preferable combination of berthing periods to be used for a modified voyage schedule.

(12) In the above explained embodiment, each of voyage management server device 11, shipboard terminal device 12 and maritime weather data distribution server device 13 is realized by a general purpose computer that executes data processing in accordance with an application program for the device. Alternatively, any of voyage management server device 11, shipboard terminal device 12 and maritime weather data distribution server device 13 may be configured as a so-called dedicated device.

The present invention may be implemented in various forms such as a device like voyage management server device 11, a program causing a computer to function as a device like voyage management server device 11, a computer-readable recording medium continuously storing the program, and a method of data processing executed by a device like voyage management server device 11.

DESCRIPTION OF REFERENCE NUMERALS

1 . . . berthing-time determination support system, 8 . . . communication satellite, 9 . . . ship, 10 . . . computer, 11 . . . voyage management server device, 12 . . . shipboard terminal device, 13 . . . maritime weather data distribution server device, 101 . . . CPU, 102 . . . memory, 103 . . . communication I/F, 104 . . . input-output I/F, 110 . . . storage unit, 111 . . . acquisition unit, 112 . . . calculation unit, 113 . . . data generating unit, 114 . . . output unit, 115 . . . modifying unit, 1121 . . . speed calculation unit, 1122 . . . sectional fuel consumption calculation unit, 1123 . . . total fuel consumption calculation unit, 1124 . . . comparing unit.

The invention claimed is:

1. A system for managing a schedule of a voyage made by a ship sailing on a sailing route from a departure port to a destination port, the ship visiting one or more ports on the sailing route, the system comprising:

a GPS device configured to measure a current position of the ship; and a processor operatively coupled to the GPS device, the processor configured to:

acquire distance data sets indicating a distance between two ports with regard to each set of two consecutive ports on the sailing route;

acquire fuel consumption rate data sets each indicating a fuel consumption rate when the ship sails at a certain sailing speed;

acquire a current voyage schedule data set indicating a current schedule of the voyage containing a starting time of a time period during which the ship is docked at a berth of each of the one or more ports, an ending time of the time period and an arrival time when the ship arrives at the destination port;

calculate a sailing speed at which the ship sails from a port to a subsequent port with regard to each set of two consecutive ports on the sailing route as a current sailing speed, based on the current voyage schedule data set and the distance data sets;

calculate a fuel consumption required for the ship to sail from the current position of the ship measured by the GPS device to the destination port as a current fuel consumption, based on the current sailing speed, the distance data sets and the fuel consumption rate data sets;

acquire a modified voyage schedule data set indicating a modified schedule of the voyage that is different from the current schedule of the voyage with regard to at least one of the starting times, the ending times and the arrival time;

calculate a sailing speed at which the ship sails from a port to a subsequent port with regard to each set of two consecutive ports on the sailing route as a modified sailing speed, based on the modified voyage schedule data set and the distance data sets;

calculate a fuel consumption required for the ship to sail from the current position of the ship measured by the GPS device to the destination port as a modified fuel consumption, based on the modified sailing speed, the distance data sets and the fuel consumption rate data sets;

compare the current fuel consumption and the modified fuel consumption; and output a data set indicating a result of the comparison.

2. The system of claim 1, wherein a user selectively adjusts the sailing route based on the data set indicating the result of the comparison.

\* \* \* \* \*